(12) United States Patent
Heverly, II et al.

(10) Patent No.: US 9,027,873 B2
(45) Date of Patent: May 12, 2015

(54) SYSTEM AND METHOD FOR VIBRATION CONTROL IN A ROTORCRAFT USING AN ADAPTIVE REFERENCE MODEL ALGORITHM

(75) Inventors: David E. Heverly, II, Arlington, TX (US); Rupinder Singh, Arlington, TX (US); John Pappas, Haltom City, TX (US)

(73) Assignee: Textron Innovations Inc., Providence, RI (US)

( * ) Notice: Subject to any disclaimer, the term of this patent is extended or adjusted under 35 U.S.C. 154(b) by 748 days.

(21) Appl. No.: 13/202,731

(22) PCT Filed: Mar. 1, 2010

(86) PCT No.: PCT/US2010/025720
§ 371 (c)(1),
(2), (4) Date: Aug. 22, 2011

(87) PCT Pub. No.: WO2010/099521
PCT Pub. Date: Sep. 2, 2010

(65) Prior Publication Data
US 2011/0303784 A1 Dec. 15, 2011

Related U.S. Application Data

(60) Provisional application No. 61/156,141, filed on Feb. 27, 2009.

(51) Int. Cl.
*G05B 21/00* (2006.01)
*B64C 27/00* (2006.01)
(Continued)

(52) U.S. Cl.
CPC ......... *B64C 27/001* (2013.01); *B64C 2027/004* (2013.01); *F16F 15/002* (2013.01);
(Continued)

(58) Field of Classification Search
USPC ........................................................ 244/17.13
See application file for complete search history.

(56) References Cited

U.S. PATENT DOCUMENTS

| 4,819,182 A | 4/1989 | King et al. |
|---|---|---|
| 5,126,641 A | 6/1992 | Putnam et al. |

(Continued)

OTHER PUBLICATIONS

Examination report in related Chinese patent application No. 201080009801.4, mailed Aug. 30, 2013, 7 pages.

(Continued)

*Primary Examiner* — Brian M O'Hara
(74) *Attorney, Agent, or Firm* — James E. Walton; Brian E. Harris

(57) ABSTRACT

The adaptive reference model algorithm uses a gain scheduling feature combined with a customized Least-Squares routine as an adaptive method for adjusting feedback control so as to account for variations in Transfer Function (G), thereby optimizing the effectiveness of the Active Vibration Control (AVC) System. The Least-Squares routine identifies the transfer function in a background process without interruption of closed loop vibration control. This identification approach is accomplished without intentional interrogation of the AVC actuators and without intentional vibration level changes. For this adaptive control logic, the dynamic relationship between AVC actuators and AVC sensors is represented by a mathematical model of Transfer Function (G). The mathematical model of Transfer Function (G) is continuously updated by the Least-Squares routine. A feedback gain (H) is computed from the mathematical model of Transfer Function (G), and the feedback gain (H) is updated each time the mathematical model of Transfer Function (G) is updated.

10 Claims, 3 Drawing Sheets

(51) Int. Cl.
*F16F 15/00* (2006.01)
*G10K 11/178* (2006.01)

(52) U.S. Cl.
CPC .... *G10K11/1788* (2013.01); *G10K 2210/1281* (2013.01); *G10K 2210/3012* (2013.01); *G10K 2210/3055* (2013.01); *G10K 2210/3056* (2013.01)

(56) References Cited

U.S. PATENT DOCUMENTS

| | | | |
|---|---|---|---|
| 5,219,143 | A | 6/1993 | Staple et al. |
| 5,713,438 | A | 2/1998 | Rossetti et al. |
| 5,954,169 | A | 9/1999 | Jensen |
| 6,002,778 | A | 12/1999 | Rossetti et al. |
| 6,229,898 | B1 | 5/2001 | Goodman |
| 6,402,089 | B1 | 6/2002 | Kiss et al. |
| 6,460,803 | B1 | 10/2002 | Kiss et al. |
| 6,493,689 | B2 | 12/2002 | Kotoulas et al. |
| 6,751,602 | B2 | 6/2004 | Kotoulas et al. |
| 6,772,074 | B2 | 8/2004 | Millott et al. |
| 6,856,920 | B2 | 2/2005 | Millott et al. |
| 7,003,380 | B2 | 2/2006 | MacMartin et al. |
| 7,107,127 | B2 | 9/2006 | Goodman |
| 7,197,147 | B2 | 3/2007 | Millott et al. |
| 7,216,018 | B2 | 5/2007 | Zuo et al. |
| 7,224,807 | B2 | 5/2007 | Welsh et al. |
| 2006/0054738 | A1 | 3/2006 | Badre-Alam |

OTHER PUBLICATIONS

"Self-Turning Regulators for Multicyclic Control of Helicopter Vibration", Wayne Johnson, NASA Technical Paper, 1996.
International Search Report mailed by ISA/USA, U.S. Patent and Trademark Office on Apr. 22, 2010 for International Patent Application No. PCT/US10/25720.
International Preliminary Examination Report mailed by IPEA/US, U.S. Patent and Trademark Office on Apr. 20, 2011 for International Patent Application No. PCT/US10/25720.
Corrected International Preliminary Examination Report mailed by IPEA/US, U.S. Patent and Trademark Office on Jun. 20, 2011 for International Patent Application No. PCT/US10/25720.
Johnson, Wayne, Self-tuning regulators for multicyclic control of helicopter vibration, NASA Technical Paper 1996, Mar. 1982.
Examination report in related Canadian patent application No. 2,752,701, mailed Jul. 17, 2013, 2 pages.
Office Action in related Canadian patent application No. 2,752,701, dated Jun. 12, 2014.
Extended European Search Report dated Jul. 9, 2014 from counterpart EP App. No. 10746964.5.

SYSTEM AND METHOD FOR VIBRATION CONTROL IN A ROTORCRAFT USING AN ADAPTIVE REFERENCE MODEL ALGORITHM

TECHNICAL FIELD

The present application relates to vibration control in rotorcraft.

DESCRIPTION OF THE PRIOR ART

Aircraft, such as rotorcraft, experience vibration concerns due in part to one or more large rotating rotors. Rotors are a primary source of vibration upon the fuselage of rotorcraft. Significant fuselage vibrations can contribute to flight control problems, material fatigue, maintenance costs, and pilot fatigue, to name a few. Significant time and expense has been spent in the rotorcraft industry in attempts to reduce and cancel rotorcraft vibrations. Traditionally, rotorcraft vibrations have been addressed with passive devices, such as vibration isolation systems and dynamic absorbers. These passive devices, which are tuned relative to the operating frequency of the aircraft rotor, have proven to be very effective for legacy rotorcraft. However, variable rotor speed (RPM) rotorcraft configurations are becoming more attractive in part due to initiatives to improve performance and reduce noise pollution. As a result, the passive vibration solutions previously effective on single rotor speed rotorcraft fall short when implemented on a variable rotor speed rotorcraft.

Hence, there is a need for an improved system and method for controlling vibration in a rotorcraft.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
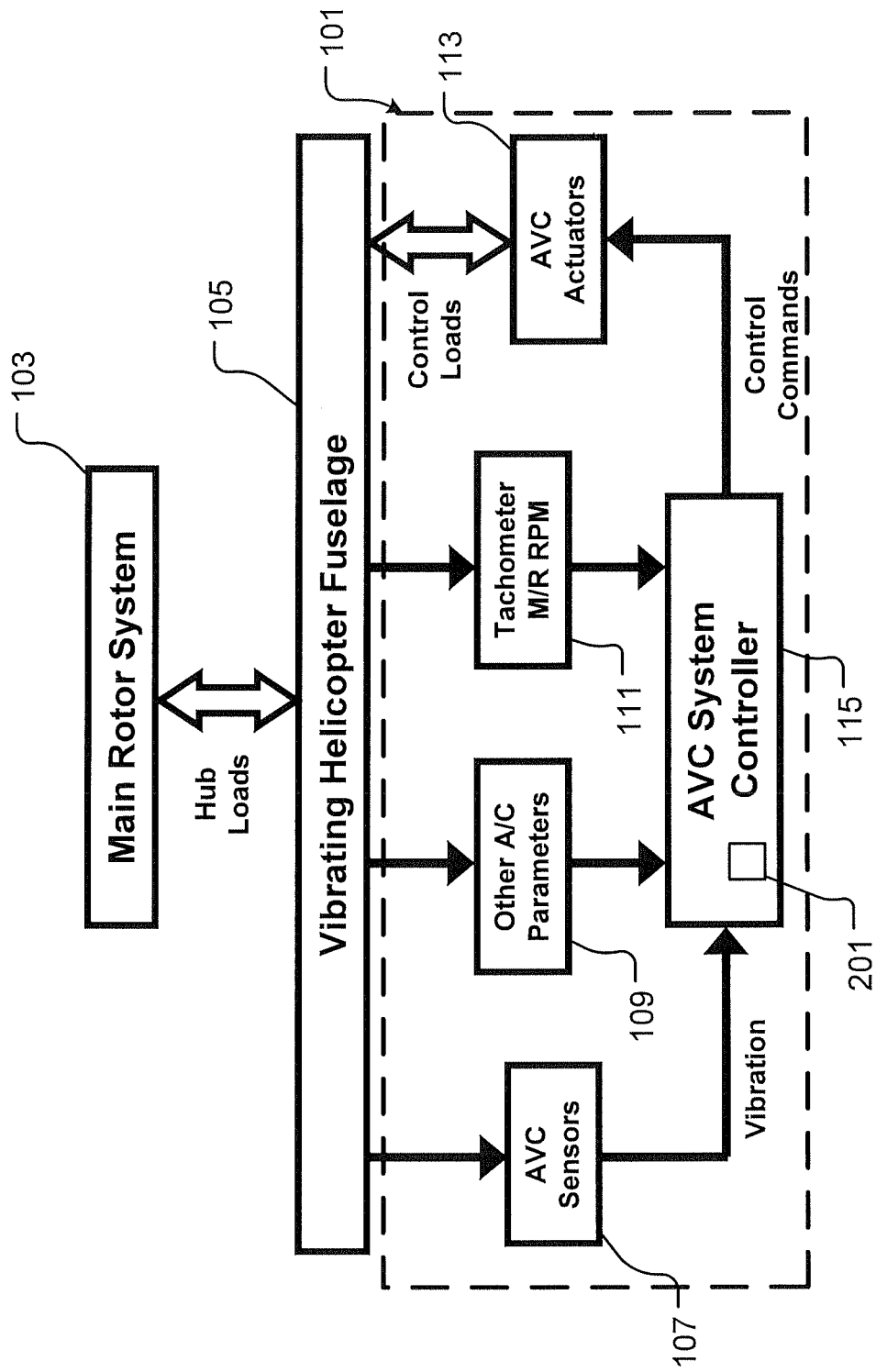
FIG. 1 is a block diagram of an Active Vibration Control system according to the preferred embodiment.

While the system of the present application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the intention is to cover all modifications, equivalents, and alternatives falling within the spirit and scope of the system of the present application as defined by the appended claims.

DESCRIPTION OF THE PREFERRED EMBODIMENT

Illustrative embodiments of system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The disclosed system and method employs an Active Vibration Control (AVC) system in order to reduce vibration in a rotorcraft. Embodiments of the present system and method can be used in rotorcraft, fixed-wing aircraft, tiltrotor, as well as hybrid aircraft being part rotorcraft and part road vehicle, to name a few. The present AVC system reduces fuselage vibration by utilizing actuators to create controllable actions that minimize vibration produced by the main rotor system. The actuators can function within the rotor system or function in the fuselage. It is preferred that the actuators used in the AVC system reside within the rotorcraft fuselage; however, alternative embodiments may employ effectors in a variable of locations, including outside the fuselage. Actuators can be of several forms such as, electro-mechanical force generating devices attached to the fuselage structure, devices attached at the fuselage/rotor interface, devices attached to each rotor blade, or devices that change the shape of the rotor blade in a controllable manner.

The AVC system of the present application is particularly well suited for variable rotor speed (RPM) rotorcraft configurations; however, even constant RPM rotorcraft can effectively employ the AVC system of the present application. For example, in any rotorcraft, the dynamic response of the rotorcraft can change significantly as the rotorcraft's gross weight varies as a result of fuel consumption and cargo changes. Rotorcraft airframe vibrations characteristics can also vary due to time, use, aging of the airframe, and installation of non-standard equipment. Further, vibration characteristics of individual rotorcraft vary due to normal tolerance variation in manufacturing and assembly processes, thereby making each rotorcraft unique to a certain degree. The AVC system of the present application is robust, adaptive, and has the ability to suppress vibrations for expected variations in airframe vibration characteristics. In addition, the adaptive features of the AVC system are transparent to the passengers of the aircraft, so that adjustments to the AVC system are not perceived by occupants of the rotorcraft. Further, the adaptive mechanisms of the AVC system are automated thereby not requiring pilot or crewmember inputs.

Now referring to FIG. 1 in the drawings, a block diagram is shown to exemplify the functionality of an AVC system 101 in conjunction with a rotorcraft, according to the preferred embodiment. A main rotor system 103 (shown in FIG. 3), being part of the rotorcraft propulsion system, imparts physical vibrations upon a helicopter fuselage 105 (shown in FIG. 3) at a harmonic frequency based upon the number of rotor blades and the rotational speed. AVC system 101 further has sensors 107, such as accelerometers, which measure vibrations of the fuselage 105. AVC system 101 also comprises a controller 115, or computer, to process the vibration data from sensors 107 and output control commands to actuators 113. Actuators 113 produce controllable fuselage vibrations to cancel vibrations produced by main rotor system 103. An amplifier may be used to amplify control commands from controller 115 in order to provide actuators 113 with a suitable drive signal. A tachometer 111 is used to selectively supply controller 115 with frequency and phase information from main rotor system 103. Aircraft parameters 109 are recorded and provided to controller 115, the parameters may include: rotorcraft gross weight, fuel quantity, air-speed, altitude information, other parameters deemed important for vibration control. It should be appreciated that other aircraft parameters 109 can be recorded to provide controller 115 with additional data, depending on the configuration. In order for AVC system 101 to operate effectively, the amplitude, phasing, and frequency of the vibration generated by actuators 113 must cancel undesired vibrations. The magnitude and phase relationship between sensors 107 and actuators 113, also referred to as Transfer Function (G), must be known in order for AVC system 101 to effectively suppress vibration.

If Transfer Function (G) were to remain constant, or behave linearly, then a frequency domain optimal control formulation could be used. Expression (5), as noted in Wayne Johnson (1982) "*Self-Tuning Regulators for Multicycle Control of Helicopter Vibrations*, Nasa Technical Paper 1996, March 1982, is a frequency domain optimal control formulation which assumes a linear Transfer Function (G) relationship between the resulting vibrations and the oscillatory load inputs from the AVC actuators. Expressions (1)-(4) depict a derivation of the optimal control formulation in expression (5). In the frequency domain, the vibration measured by each sensor, or accelerometer, at the blade passage frequency (NΩ) can be represented as:

$$x_i(t) = X_{Re\_i} * \cos(N\Omega t) + X_{Im\_i} * \sin(N\Omega t) \quad (1)$$
$$= [\cos(N\Omega t) \ \sin(N\Omega t)] \begin{Bmatrix} X_{Re\_i} \\ X_{Im\_i} \end{Bmatrix}$$
$$\{x\} = \{X_{Re\_1} \ X_{Im\_1} \ X_{Re\_2} \ X_{Im\_2} \ \ldots \ X_{Re\_p} \ X_{Im\_p}\}^T$$
$$i = 1, 2, \ldots, p$$

Similarly, a frequency domain representation of the actuator command signals can be expressed as:

$$u_i(t) = U_{Re\_i} * \cos(N\Omega t) + U_{Im\_i} * \sin(N\Omega t) \quad (2)$$
$$= [\cos(N\Omega t) \ \sin(N\Omega t)] \begin{Bmatrix} U_{Re\_i} \\ U_{Im\_i} \end{Bmatrix}$$
$$\{u\} = \{U_{Re\_1} \ U_{Im\_1} \ U_{Re\_2} \ U_{Im\_2} \ \ldots \ U_{Re\_p} \ U_{Im\_p}\}^T$$
$$i = 1, 2, \ldots, q$$

Mathematically, the vibration control problem can be represented by a global model as:

$$\{z\} = \{x\} + \{y\} = \{x\} + [G]\{u\} \quad (3)$$

where the vector {z} is the harmonic coefficients of the controlled vibration response, {x} is the uncontrolled vibration response due to external excitation such as the main rotor, and {y} is the harmonic coefficients of the vibration generated by the AVC system. Matrix [G] is the complex transfer function between the AVC actuator inputs {u} and the fuselage vibration response. Effective vibration suppression is achieved when the norm of vector {z} approaches zero, or when the harmonic coefficients of vector {y} are of equal magnitude and opposite sign to the corresponding coefficients of vector {x}. The appropriate control action {u} is computed based on optimal control theory, which minimizes a quadratic cost function. The cost function J is a weighted sum of the resultant vibration and the control actions. Defined as:

$$J = \{z\}^T [W_z]\{z\} + \{u\}^T [W_u]\{u\} \quad (4)$$

where $[W_z]$ and $[W_u]$ are diagonal matrices of weighting factors. The weighting matrices $[W_z]$ and $[W_u]$ can be tailored to emphasize vibration reduction over control effort reduction or vice versa. Also, $[W_z]$ and $[W_u]$ can be tailored to put more emphasis on certain elements of {z} or {u} respectively. By minimizing the cost function J, the optimal control solution is simultaneously achieving the greatest vibration reduction with the least control effort. Minimization of the cost function yields the following optimal control effort formulation:

$$\{u\} = -([G]^T[W_z][G] + [W_u])^{-1} * ([G]^T[W_z]) * \{z\} = [H] * \{z\} \quad (5)$$

The above control expression (5) is optimal and effective provided the transfer function [G] is an accurate representation of the actual AVC system dynamics. One embodiment of a digital feedback control law that utilizes the optimal control solution is the following expression (6):

$$\{u\}_{k+1} = \{u\}_k + \alpha[H]\{z\}_k \quad (6)$$

where the subscript k represents a discrete time index, α represents a caution factor (0<α<1), [H] is the optimal gain matrix, {z} is the vector of harmonic coefficients at the current time step, and {u} is the actuator command signal vector of harmonic coefficients. It should be understood that alternate feedback control laws are acceptable to be incorporated into the algorithm.

However, in practice the Transfer Function (G) is not constant throughout the flight of the rotorcraft, nor is it constant from one rotorcraft to another of the same model. Typically, the Transfer Function (G) is frequency dependent, rotorcraft airframe dependent, and time-varying throughout the flight of rotorcraft. Transfer Function (G) changes can result from rotorcraft in flight RPM changes, fuel consumption, cargo changes, rotorcraft aging, or manufacturing variations. If a constant feedback gain matrix (H) was to be used, and the change in Transfer Function (G) large, then such an AVC system would become unstable and increase vibration rather than reduce vibration. Variations in Transfer Function (G) can be in the form of magnitude changes, phase changes, or combined magnitude and phase changes. Because of variations in Transfer Function (G), AVC System Controller 115 of AVC system 101 requires an adaptive controller algorithm that can accommodate variations in Transfer Function (G) in order to optimally control vibration.

Figure 2:
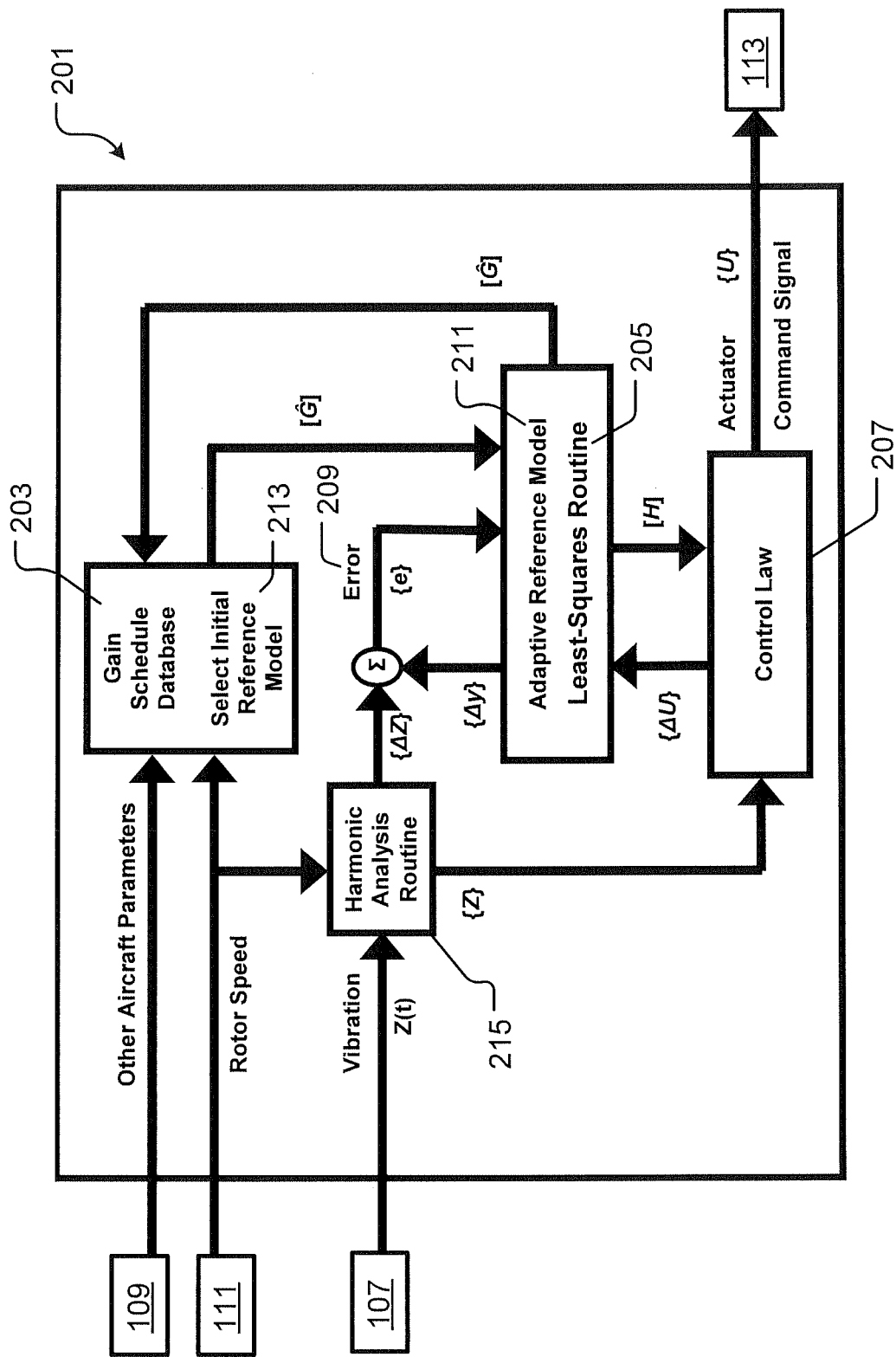
FIG. 2 is a block diagram of an adaptive reference model algorithm from the system shown in FIG. 1.

Now referring also to FIG. 2, an adaptive reference model algorithm 201, positioned schematically in AVC System Controller 115, of FIG. 1, is shown in further detail. Adaptive reference model algorithm 201 uses a gain scheduling feature combined with a customized Least-Squares routine 205 as an adaptive method for adjusting feedback control so as to account for variations in Transfer Function (G), thereby optimizing the effectiveness of AVC System 101. The Least-Squares routine 205 identifies the transfer function in a background process without interruption of closed loop vibration control. This identification approach is accomplished without intentional interrogation of the AVC actuators 113 and without intentional vibration level changes. For this adaptive control logic, the dynamic relationship between AVC actuators 113 and sensors 107 is represented by a mathematical model of Transfer Function (G). The mathematical model of Transfer Function (G) is continuously updated by the Least-Squares routine 205. A feedback gain (H) is computed from the mathematical model of Transfer Function (G), and the feedback gain (H) is updated each time the mathematical model of Transfer Function (G) is updated.

The Least-Squares routine 205 is structured to minimize an error 209. The error 209 is the difference between a measured vibration response from sensors 107 and a predicted vibration response from the mathematical model of Transfer Function (G). The predicted vibration response is computed from the mathematical model of Transfer Function (G) and commands to actuators 113. When the error 209 approaches zero, the mathematical model of Transfer Function (G) accurately represents the true system dynamics, and the predicted vibration matches the measured vibration from sensors 107. When mathematical model of Transfer Function (G) is an accurate representation, then feedback gain (H) derived from mathematical model of Transfer Function (G) is also accurate, thereby providing optimum vibration attenuation. It should be appreciated that this transfer function identification method, as represented in part as adaptive reference model 211, does not intentionally excite actuators 113 in order to determine transfer function, which can create disturbing vibrations felt by helicopter pilots and crew. It should also be appreciated that adaptive reference model 211 does not require knowledge from aircraft parameters 109, such as gross weight, fuel quantity, airspeed, altitude, and the like, although such information may be beneficial.

The Least-Squares routine 205 utilizes measured vibration from sensors 107, and also utilizes command forces to actuators 113. In order to make adjustments to the mathematical model of Transfer Function (G), a finite set of data must be collected and processed before an adjustment is made. Therefore, the Least-Squares routine 205 may not respond well to rapid transfer function changes. In order to overcome this limitation, adaptive reference model 211 is augmented with gain scheduling, via a gain schedule database 203, for known rapid transfer function changes. In addition, adaptive reference model 211 needs an initial starting guess to adapt upon. As such, an initial reference model 213 may be used as an initial starting guess. It should be appreciated that the gain scheduling functionality allows mathematical model of Transfer Function (G) in adaptive reference model 211 to change when subjected to a known sudden and quick change of the AVC Transfer Function (G). When the Transfer Function (G) changes slowly over time, then enough data can be processed for proper adjustments to mathematical model of Transfer Function (G) and the Least-Squares routine 205 alone responds well.

The Least-Squares routine 205 for reference model 211 is derived with discrete time variables. Error 209, being the difference between the actual measured vibration response and the predicted vibration response from mathematical model of Transfer Function (G), is represented by expression (7):

$$\{e\}_k = (\{z\}_k - \{z\}_{k-1}) - (\{x\}_k - \{x\}_{k-1}) - [\hat{G}](\{u\}_k - \{u\}_{k-1})$$
$$\{e\}_k = \{\Delta z\}_k - \{\Delta x\}_k - [\hat{G}]\{\Delta u\}_k \quad (7)$$

Where $\{e\}$ is the error vector of harmonic coefficients for each control sensor, $\{z\}$ is the measured vibration response, $\{x\}$ is the uncontrolled vibration response, $\{u\}$ is the AVC command signal. The matrix $[\hat{G}]$ is the mathematical reference model of the AVC Transfer Function (G). Each of the response vectors are written as differences between values at two discrete times. Two successive time indices have been used for illustrative purposes, but is not a requirement. It is assumed that between the selected time indices the command signal has changed ($\{\Delta u\} > 0$), and the change in measured vibration $\{\Delta z\}$ is mostly due to the AVC command signal change $\{\Delta u\}$. Thus, it is assumed $\{\Delta x\}$ is small compared to $\{\Delta y\}$ and the error formulation simplifies to expression (8):

$$\{e\}_k \cong \{\Delta z\}_k - [\hat{G}]\{\Delta u\}_k \text{ or } \{\Delta z\}_k \cong [\hat{G}]\{\Delta u\}_k \quad (8)$$

The reference model matrix $[\hat{G}]$ is a (n×m) matrix and the command signal vector is (m×1). The reference model matrix and command vector can be reorganized such that:

$$[\Phi]_k^T \{\hat{\theta}\} = [\hat{G}]\{\Delta u\}_k \cong \{\Delta z\}_k \{e\}_k \cong \{\Delta z\}_k - [\Phi]_k^T \{\hat{\theta}\} \quad (9)$$

Vector $\{\hat{\theta}\}$ is (nm×1) and composed by stacking the rows of $[\hat{G}]$ into a column vector. Matrix $[\Phi]_k^T$ is (n×nm) and composed from the command signal vector $\{\Delta u\}$ as repeated rows to form a block diagonal matrix. The error function can be minimized in a least-squares sense, and the solution for $\{\hat{\theta}\}$ by batch mode processing of several observations is:

$$\{\hat{\theta}\} = ([\Phi]_k^T [\Phi]_k)^{-1} [\Phi]_k^T \{\Delta z\}_k \quad (10)$$

The solution vector $\{\hat{\theta}\}$ contains the reference model matrix $[\hat{G}]$ parameters that minimize the error function in a least-squares sense. Thus, based on the data that was collected and analyzed, the reference model is now an accurate representation of the actual AVC Transfer Functions (G). The solution can also be obtained by a recursive least-squares formulation of the form:

$$\{\hat{\theta}\}_k = \{\hat{\theta}\}_{k-1} + ([\Phi]_k^T [\Phi]_k)^{-1} [\Phi]_k (\{\Delta z\}_k - [\Phi]_k^T \{\hat{\theta}\}_{k-1}) \quad (11)$$

Another simplified recursive solution that avoids matrix inversion is a Least Mean Square (LMS) solution of the form:

$$\{\hat{\theta}\}_k = \{\hat{\theta}\}_{k-1} + \gamma[\Phi]_k (\{\Delta z\}_k - [\Phi]_k^T \{\hat{\theta}\}_{k-1}) \quad 0 < \gamma < 2 \quad (12)$$

It should be appreciated that other variations on these least-squares solutions may exist, but the underlying solution technique is similar. How the solution is obtained is not critical, just that a solution is obtained to minimize error function.

Again referring to FIG. 2, adaptive reference model algorithm 201 consists of two primary loops running in parallel and simultaneously. The first loop is harmonic analysis routine 215 followed by control law 207, which are both executed each time step. The second loop is the adaptive reference model Least-Squares routine 205 which provides the feedback gain matrix (H) utilized in control law 207.

Still referring to FIG. 2, adaptive reference model algorithm 201 according to the preferred embodiment is described in further detail. The harmonic analysis routine 215 processes vibration data from sensors 107 in order to extract the amplitude and phase at the rotor blade passage frequency (Nb/rev) and any other desired rotor harmonics. The harmonic analysis routine 215 thereby outputs frequency domain harmonic coefficients for each sensor 107. Aircraft parameters data 109 and main rotor RPM data 111 is received into the gain schedule database 203 and an appropriate reference model $[\hat{G}]$ is extracted from the gain schedule database 203. The reference model $[\hat{G}]$ is passed to the Least-Square routine 205 in order to initialize the adaptations of reference model $[\hat{G}]$. Further, a change in the control law computed command signal between a specified number of time steps is computed (e.g. $\{\Delta U\} = \{U\}_k - \{U\}_{k-i}$). In addition, a corresponding change in the measured vibration response between a specified number of time steps is computed (e.g. $\{\Delta Z\}=\{Z\}_k-\{Z\}_{k-i}$). Utilizing the current reference model $[\hat{G}]$, a predicted change in the vibration response between a specified number of time steps is computed (e.g. $\{\Delta Y\}=[\hat{G}]\{\Delta U\}$). An error function vector is computed from the measured vibration and predicted vibration (e.g. $\{e\}=\{\Delta Z\}-\{\Delta Y\}=\{\Delta Z\}-[\hat{G}]\{\Delta U\}$).

The method continues with the Least-Squares routine 205 processing data from reference model $[\hat{G}]$, change in measured vibration response $\{\gamma Z\}$, change in computed command signal $\{\Delta U\}$, and error function vector $\{e\}$. If the magnitude of the change in computed command signal $|\{\Delta U\}|$ is greater than a specified threshold, then a parameter estimate $\{\hat{\theta}\}_k$ of the reference model $[\hat{G}]$ is updated, otherwise the parameter estimate $\{\hat{\theta}\}_k$ is left unchanged. This step is enforced to ensure there is persistent excitation for the Least-Squares routine 205. As such, reference model $[\hat{G}]$ is used to initialize the parameter estimate $\{\hat{\theta}\}_k$. If $|\{\Delta U\}|>magU_{threshold}$, then $\{\Delta u\}_k$ is used to construct $[\Phi]_k^T$ and the parameter estimate is updated via $\{\hat{\theta}\}_k=\{\hat{\theta}\}_{k-1}+\gamma[\Phi]_k(\{\Delta z\}_k-[\Phi]_k^T\{\hat{\theta}\}_{k-1})$. If $|\{\Delta U\}|<magU_{threshold}$, then $\{\hat{\theta}\}_k=\{\hat{\theta}\}_{k-1}$. Based upon the previous criteria, the parameter estimate $\{\hat{\theta}\}_k$ is updated repeatedly. After a specified number of updates, the parameter estimate $\{\hat{\theta}\}_k$ is used to construct a new reference model $[\hat{G}]$. The new reference model $[\hat{G}]$ is used to create a new feedback gain matrix $[H]$, (e.g. $[H]=-([\hat{G}]^T[W_z][\hat{G}]+[W_{uu}])^{-1}*([\hat{G}]^T[W_z])$). The new mathematical reference model $[\hat{G}]$ and the new feedback gain matrix $[H]$ are output. The process continues with updating the gain schedule library 203 with the new reference model $[\hat{G}]$ where appropriate based on the other aircraft parameter data 109 and rotor speed RPM data 111. It should be noted that actuator command signals are being continuously computed via a parallel feedback path. Harmonic analysis routine 215 is utilized to output harmonic coefficients of vibration $\{z\}$, and combined with the current feed back gain matrix $[H]$ and computes the next set of command signals with control law $\{u\}_{k+1}=\{u\}_k+\alpha[H]\{z\}_k$.

Figure 3:
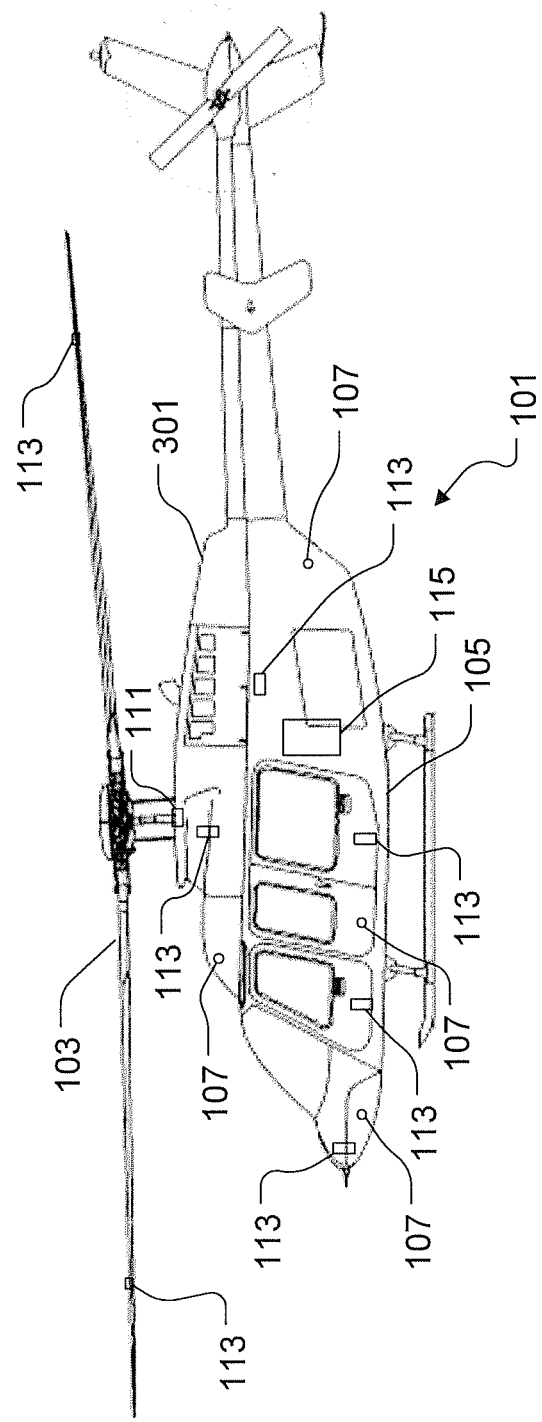
FIG. 3 is a schematic of a rotorcraft having the Active Vibration Control system according to the present application.

Referring now to FIG. 3, a rotorcraft 301 is shown having the AVC system 101 according to the preferred embodiment. AVC sensors 107 are graphically represented in various areas of rotorcraft 301. Tachometer 111 is used to calculate the rate of revolutions of the main rotor. AVC actuators 113 are graphically represented in various areas of rotorcraft 301, including fuselage 105 and the rotors of rotor system 103. AVC controller 115 is graphically represented in rotorcraft 301 as single computer, however, it should be appreciated that controller 115 can be multiple computers located in various locations in rotorcraft 301. It should be appreciated that sensors 107, tachometer 111, and actuators 113 may be located in various portions of rotorcraft 301. Sensors 107, tachometer 111, and actuators 113 are also in communication with controller 115. For example, wires (not shown) can be used as a communication medium between various components of system 101.

It is apparent that an application with significant advantages has been described and illustrated. Although the present application is shown in a limited number of forms, it is not limited to just these forms, but is amenable to various changes and modifications without departing from the spirit thereof.

The invention claimed is:

1. A method for controlling vibration in a rotorcraft, comprising:
  measuring a fuselage vibration in the rotorcraft with a sensor, the fuselage vibration originating from a propulsion system of the rotorcraft;
  determining an actuator command signal with an adaptive reference model algorithm, wherein the determining of the actuator command signal with the adaptive reference model algorithm comprises one or more iterations of:
    continuously identifying a transfer function reference model with a least-squares routine, the transfer function reference model representing a predicted relationship between the sensor and the vibration control actuator;
    computing a feedback control gain from the transfer function reference model in a closed loop; and
    updating the feedback control gain each time a true transfer function is newly identified;
    wherein the continuously identifying of the transfer function reference model with the least-squares routine occurs in a background process without interruption of the determining of the actuator command signal; and
  commanding a vibration control actuator with the actuator command signal so as to impart a cancelling vibration in a manner that at least partially cancels the vibrations originating from the propulsion system;
  wherein the closed loop includes a gain schedule database, the gain schedule database being available for providing data to the transfer function reference model during times of rapid transfer function changes, and
  wherein the least squares routine is configured to identify the transfer function reference model during times of slow changes to the true transfer function without needing information from the gain schedule database.

2. The method according to claim 1, wherein the transfer function reference model is a mathematical matrix.

3. The method according to claim 1, wherein the continuously identifying of the transfer function reference model with the least-squares routine is accomplished without interrogating the vibration control actuator.

4. The method according to claim 1, wherein the determining of the actuator command signal with the adaptive reference model algorithm further comprises:
  minimizing an error function with the least-squares routine, the error function being a difference between a change in the fuselage vibration measured with the sensor and a change in a predicted vibration response computed with the transfer function reference model;
  wherein the minimizing the error function causes the transfer function reference model to resemble the true transfer function, thereby optimizing vibration attenuation in the rotorcraft; and
  wherein the true transfer function represents an actual dynamic relationship between the sensor and the vibration control actuator.

5. The method according to claim 4, wherein the change in the predicted vibration response is computed only if the actuator command signal is changed.

6. The method according to claim 1, further comprising:
  measuring a rotorcraft parameter for controlling rotorcraft vibration and the transfer function reference model, the parameter including at least one of: rotorcraft gross weight, rotorcraft fuel quantity, rotorcraft air-speed, and rotorcraft altitude; and
  supplying the measured rotorcraft parameter changes to a feedback control logic in the closed loop portion of the adaptive reference model algorithm.

7. The method according to claim 1, further comprising:
  measuring a rotor revolutions per minute (RPM); and
  supplying a measured rotorcraft parameter to a feedback control logic in the closed loop.

8. The method according to claim 1, wherein the gain schedule database is automatically populated and updated throughout a lifetime of the rotorcraft.

9. The method according to claim 1, wherein the continuously identifying of the transfer function reference model with the least-squares routine is accomplished during closed loop vibration control without interrogating the vibration control actuator.

10. The method according to claim 1, wherein the determining of the actuator command signal with the adaptive reference model algorithm further comprises:
- minimizing an error function with the least-squares routine, the error function being a difference between a change in the fuselage vibration measured with the sensor and a change in a predicted vibration response computed with the transfer function reference model;
- wherein a known change in the actuator command signal contributes to the change in the fuselage vibration;
- wherein the minimizing of the error function causes the transfer function reference model to resemble the true transfer function, thereby optimizing vibration attenuation in the rotorcraft; and
- wherein the true transfer function represents an actual dynamic relationship between the sensor and the vibration control actuator.

* * * * *